(12) United States Patent
Docimo (10) Patent No.: US 6,988,833 B1
(45) Date of Patent: Jan. 24, 2006

(54) ROLLER BEARING WITH CAGE FASTENER

(75) Inventor: Rocco Docimo, Stamford, CT (US)

(73) Assignee: FAG Kugelfischer AG, Schweinfurt (DE)

( * ) Notice: Subject to any disclaimer, the term of this patent is extended or adjusted under 35 U.S.C. 154(b) by 80 days.

(21) Appl. No.: 10/448,217

(22) Filed: May 30, 2003

Related U.S. Application Data (60) Provisional application No. 60/384,181, filed on May 30, 2002.

(51) Int. Cl.
*F16C 33/46* (2006.01)
*F16C 33/50* (2006.01)

(52) U.S. Cl. .................. 384/578; 384/572; 384/579
(58) Field of Classification Search ............... 384/572, 384/579, 578, 574, 577, 523, 530; 29/898.067
See application file for complete search history.

(56) References Cited

U.S. PATENT DOCUMENTS

| | | | |
|---|---|---|---|
| 796,200 A * | 8/1905 | Fox ............................ 384/579 |
| 3,290,982 A | 12/1966 | Marschner | |
| 3,938,865 A | 2/1976 | Rouverol | |
| 3,962,775 A | 6/1976 | King, Jr. | |
| 4,006,945 A | 2/1977 | Sekerich | |
| 4,157,675 A | 6/1979 | King, Jr. | |
| 4,198,895 A | 4/1980 | Ruhl | |
| 4,203,346 A | 5/1980 | Hall et al. | |
| 4,324,518 A | 4/1982 | Dixon | |
| 4,437,805 A | 3/1984 | Smith | |
| 4,472,096 A | 9/1984 | Ruhl et al. | |
| 4,613,239 A | 9/1986 | Hofmann et al. | |
| 4,813,834 A | 3/1989 | Smith | |
| 4,861,171 A | 8/1989 | Adachi | |
| 4,900,205 A | 2/1990 | Sadri | |
| 5,007,781 A | 4/1991 | Jensen et al. | |
| 5,213,460 A | 5/1993 | Sadri et al. | |
| 5,474,389 A * | 12/1995 | Garcia ........................ 384/572 |
| 5,660,485 A * | 8/1997 | Podhajecki et al. ......... 384/572 |
| 5,882,125 A | 3/1999 | Wahler | |
| 6,019,518 A | 2/2000 | Yoon | |
| 6,022,147 A * | 2/2000 | Murai et al. ................ 384/574 |
| 6,132,102 A | 10/2000 | Bessone et al. | |
| 6,196,724 B1 | 3/2001 | Murai et al. | |
| 6,203,205 B1 | 3/2001 | Murai et al. | |
| 6,389,202 B1 | 5/2002 | Delpiano et al. | |
| 6,397,982 B2 | 6/2002 | Rancourt | |

* cited by examiner

*Primary Examiner*—Thomas R. Hannon
(74) *Attorney, Agent, or Firm*—Morgan, Lewis & Bockius (57) ABSTRACT

A roller bearing with cage fasteners that prevent cage separation under adverse operating conditions. The roller bearing has an inner race, outer race, a plurality of rollers, a roller cage, and cage fasteners. The inner race is disposed about a rotational axis and includes a peripheral surface facing the rotational axis with an inner nominal diameter of seven inches about the rotational axis. The outer race has a circumferential surface surrounding the inner race and includes an outer nominal diameter of twelve inches about the rotational axis. The roller cage is disposed between the inner race and the outer race and includes a first piece and a second piece connected together by the cage fasteners. Each of the cage fasteners includes a first surface having a first effective area in contiguous engagement with the first piece of the roller cage, and a second surface having a second effective area in contiguous engagement with the second piece of the roller cage. The first and second effective areas are generally equal to each other.

25 Claims, 4 Drawing Sheets

ROLLER BEARING WITH CAGE FASTENER

PRIORITY

This application claims the benefits under 35 U.S.C. § 119 of now abandoned U.S. Provisional Application Ser. No. 60/384,181 filed on 30 May 2002, entitled "Cylindrical Roller Bearing with Cage Fastener," which Provisional Application is hereby incorporated by reference in its entirety in this application.

BACKGROUND OF THE INVENTION

A roller bearing can utilize a cage with multiple parts that are fastened with swaged fasteners to retain the rollers in the cage. In the locomotive industry, a known roller bearing utilizing swaged fasteners for a cage has a "pitch" diameter of about 10 inches. The "pitch" diameter of the bearing is generally two times a distance between the centerline of the rollers with respect to a rotational axis of the bearing. The known roller bearing has a two-piece cage to retain a plurality of rollers between outer and inner races. The cage has an annular cover and an annular base with projecting fingers arranged in an equiangular array about the rotational axis. Each swaged fastener can secure the annular cover to the annular base of the cage by initially mounting a shank portion of the fastener through apertures formed through the cover and base of the cage. A force, i.e., a preload, to ensure that the cage cover and base are fixed to each other is applied through the shank of the fasteners with a suitable tool. While the preload is being applied to the bolt having a shank of a fastener, a collar is swaged to the bolt, thereby allowing the fastener (e.g., bolt and collar) to retain the cage cover and base together via the force of the preload. When the known roller bearing is fully assembled, the fasteners permit the bearing to transmit loads and to maintain a fixed spatial relationship between the cage, races and rollers in the operational environment of a locomotive.

Such operational environment can be demanding on the ability of the bearing to carry a load for a suitable service life. Generally, the known bearing is configured to withstand an operating environment where a shock loading is on the order of 10–15 Gs (i.e., 1 G being an acceleration constant), cage accelerations up to 2000 rpm/sec and bearing resonant frequencies above 70H and is predicted to have an useful service life of as long as a million miles. That same bearing—operating under adverse operating conditions—may not fulfill the predicted service life of a million miles and could be of much lower duration. For example, the known bearing under adverse operating conditions, such as, repeated shock loads of approximately 80 Gs, may have a useful service life of 300,000 miles or less.

It is believed that bearing performance degradation under the increased shock loading may be evident in the proximity of the cage fastener. More particularly, the fastener apertures in the open cage may become enlarged thereby causing misalignment of the bearing components and, in particular, separation of the components of the cage. It has been found that the known bearing arrangement may experience failure, which is believed to be the result of the change in the spatial relationship between cage geometry and fastener geometry while operating under extreme or adverse conditions. In particular, the known bearing has a nominal diameter about the central axis of the bearing to the rotational axis of the cylindrical roller bearing (the pitch circle diameter) of approximately ten inches (10 in.). The known bearing has a two-piece cage with a fastener that includes a bolt and a collar. The bolt has a shank with a nominal shank diameter of 3/16 inches, a final length (measured from the inside of the bolt head to the outside of the collar) of approximately 3.4 inches with a surface arranged to engage a portion of the cage. The surface of the shank has a diameter of approximately 0.329 inches. The collar has a diameter of approximately 0.300 inches and includes a surface that engages another portion of the cage. Each of the surfaces that engages the respective portion of the cage provides an effective area in which the head or collar applies a retention force to the cage. The effective area of the known fastener may be calculated by evaluating the total surface area of the fastener that engages the cage. For example, the respective surface of the bolt head and collar that engages the cage less the surface area of the aperture in which a shank of the fastener is disposed therein. The effective areas of the known bolt head and collar are therefore approximately 0.048 in.$^2$ and 0.042 in.$^2$, respectively. Under adverse operating conditions, the known fastener with these effective areas has been found to be unable to retain the cage for a suitable service life.

It is recognized engineering practice that, in order to provide sufficient clamping force to components in which the fastener is unable to secure the components together, a possible solution is to increase the size of the bolt head or the collar. Such solution, however, may not be suitable depending on the operational or physical constraints specific to the fastener or the application in which the fastener is being used therein. Thus, the application of this engineering practice is specific to the particular fastening arrangement and the inclination to apply this solution may not be applicable to fasteners in roller bearing cage—where the fasteners have been inadequate in retaining the cage under adverse operating conditions—once all the components, including the fasteners, of the roller bearing have been evaluated.

In the case of the known bearings, individuals specializing in the fastener art have recommended, upon evaluation of the performance of the fastening arrangement in the known roller bearing in which the fasteners have been inadequate in retaining the cage under adverse operating conditions, that an increased preload to the fasteners would be required to secure the components of the cage together. To ensure that the fastener is able to withstand the recommended increase in preload, these individuals have indicated that the nominal size of the shank of the fastener would have to be increased, nominally, from 3/16 to 1/4 inches. These individuals have also indicated that an increase in the effective surface areas of the fastener would be required to reduce stress concentration on the cage surfaces. The recommended increase in the preload would also necessitate a larger bolt head than those of the known fasteners. Consequently, the fastener apertures in the cage would also have to be enlarged to accommodate the larger shank of such a bolt (i.e., 1/4 inch nominal diameter shank) and the known cage configuration may have to be altered, modified or redesigned to allow a collar to be swaged to the shank. These changes to the cage could affect the performance of the cage, which may require a roller bearing incorporating these changes in the cage to undergo testing and re-certification before being placed into operational service.

Therefore, it would be desirable to provide for a solution to the problem of cage separation while utilizing the existing cage and roller arrangement.

SUMMARY OF THE INVENTION

A preferred embodiment provides for a roller bearing, which may be used in locomotives that employ a plurality of rollers held between races and secured by a fastener in a multi-piece cage. In particular, a preferred embodiment provides for a roller bearing. The roller bearing has an inner race, outer race, a plurality of rollers, a roller cage and at least one cage fastener. The inner race is disposed about a rotational axis and includes a peripheral surface facing the rotational axis with an inner nominal diameter of seven (7) inches about the rotational axis. The outer race has a circumferential surface surrounding the inner race and includes an outer nominal diameter of twelve (12) inches about the rotational axis. The plurality of rollers is disposed between the inner and outer races. The roller cage is disposed between the inner race and the outer race to support the rollers and includes a first piece and a second piece connected together by the at least one cage fastener. The at least one cage fastener includes a first surface having a first effective area in contiguous engagement with the first piece of the roller cage; and a second surface having a second effective area in contiguous engagement with the second piece of the roller cage. The first and second areas are generally equal to each other.

In another preferred embodiment, a roller bearing is provided. The roller bearing has an inner race, outer race, a plurality of rollers, a roller cage and at least one cage fastener. The inner race is disposed about a rotational axis and includes a peripheral surface facing the rotational axis with an inner nominal diameter of seven (7) inches about the rotational axis. The outer race has a circumferential surface surrounding the inner race and includes an outer nominal diameter of twelve (12) inches about the rotational axis. The plurality of rollers is disposed between the inner and outer races. The roller cage is disposed between the inner race and the outer race to support the rollers and includes a first piece and a second piece connected together by the at least one cage fastener. The at least one cage fastener extends along a longitudinal axis generally parallel to the rotational axis. The at least one cage fastener has first and second surfaces and a shank. The first surface has first effective area in contiguous engagement with the first piece of the roller cage. The second surface has a second effective area in contiguous engagement with the second piece of the roller cage. At least one of the first and second surfaces has a diameter about the longitudinal axis greater than 0.375 inches. The shank connects the first and second surfaces and includes a nominal diameter less than ¼ inches and a length greater than 3.4 inches along the longitudinal axis.

In yet another preferred embodiment, a roller bearing is provided with a fastener. The fastener secures at least two members of the roller bearing contiguously together. The at least two members extend along a longitudinal axis over a length of at least 3 inches. The fastener includes a shank and a collar. The shank extends between a first end and a second end along a longitudinal axis. The shank has a diameter less than ¼ inches to define a shank surface area generally orthogonal to the longitudinal axis. A shoulder disposed proximate to the first end of the shank. The shoulder has a first clamping area generally orthogonal to the longitudinal axis. The first clamping area is generally the difference between a surface area of the shoulder orthogonal to and about the longitudinal axis and the shank surface area. The collar is disposed on the shank so that the second end is disposed proximate a frangible portion of the shank. The collar has a bore extending along the longitudinal axis between a first collar end and a second collar end. The bore has an internal diameter of less than ¼ inches to receive the shank. One of the first and second collar ends has a second clamping area. The second clamping area is generally the difference between a surface area of the first end orthogonal to and about the longitudinal axis and the surface area of the bore orthogonal to and about the longitudinal axis. The second clamping area is generally equal to the first clamping area.

In a further preferred embodiment, a method of determining a preload loss capability in a roller bearing having a two-piece cage is provided. The roller bearing has an inner race with an inner nominal diameter of seven (7) inches and an outer race with an outer nominal diameter of twelve (12) inches. The two-piece cage has a first piece and a second piece with a roller cage disposed between the inner race and the outer race. A plurality of rollers is disposed between the inner and outer races and supported by the cage. The first and second pieces are connected together by at least one cage fastener. The at least one cage fastener includes a first surface having a first effective area in contiguous engagement with the first piece of the roller cage and a second surface having a second effective area in contiguous engagement with the second piece of the roller cage. The first and second areas are generally equal to each other. The method can be achieved, at least, by: exposing the fastener and the two-piece cage at a temperature of approximately 250 degrees Celsius; and determining whether the average loss of the predetermined preload on the at least one fastener is less than 50%.

In another preferred embodiment, a method of preventing separation of a two-piece cage roller bearing in a two-piece cage is provided. The roller bearing has an inner race with an inner nominal diameter of seven (7) inches and an outer race with an outer nominal diameter of twelve (12) inches. The two-piece cage has a first piece and a second piece with a roller cage disposed between the inner race and the outer race. A plurality of rollers is disposed between the inner and outer races and supported by the cage. The first and second pieces are connected together by at least one cage fastener. The at least one cage fastener includes a first surface in contiguous engagement with the first piece of the roller cage and a second surface in contiguous engagement with the second piece of the roller cage. Each of the surfaces engages the respective piece of the cage and provides a respective effective area in which the first and second surfaces provide a retention force to the cage. The effective area of the first surface or the second surface is generally determined by the difference in the surface area that engages the cage at the respective portion less the surface area of an aperture of the cage in which the fastener is supported therein. The method can be achieved, at least, by: loading the fastener with a predetermined preload, the fastener having a shank less than ¼ inches in nominal diameter; and distributing the predetermined preload equally over the first and second effective areas.

BRIEF DESCRIPTIONS OF THE DRAWINGS

The accompanying drawings, which are incorporated herein and constitute part of this specification, illustrate the preferred embodiments of the invention, and, together with the general description given above and the detailed description given below, serve to explain the features of the invention.

DESCRIPTION OF THE PREFERRED EMBODIMENTS

Figure 1A:
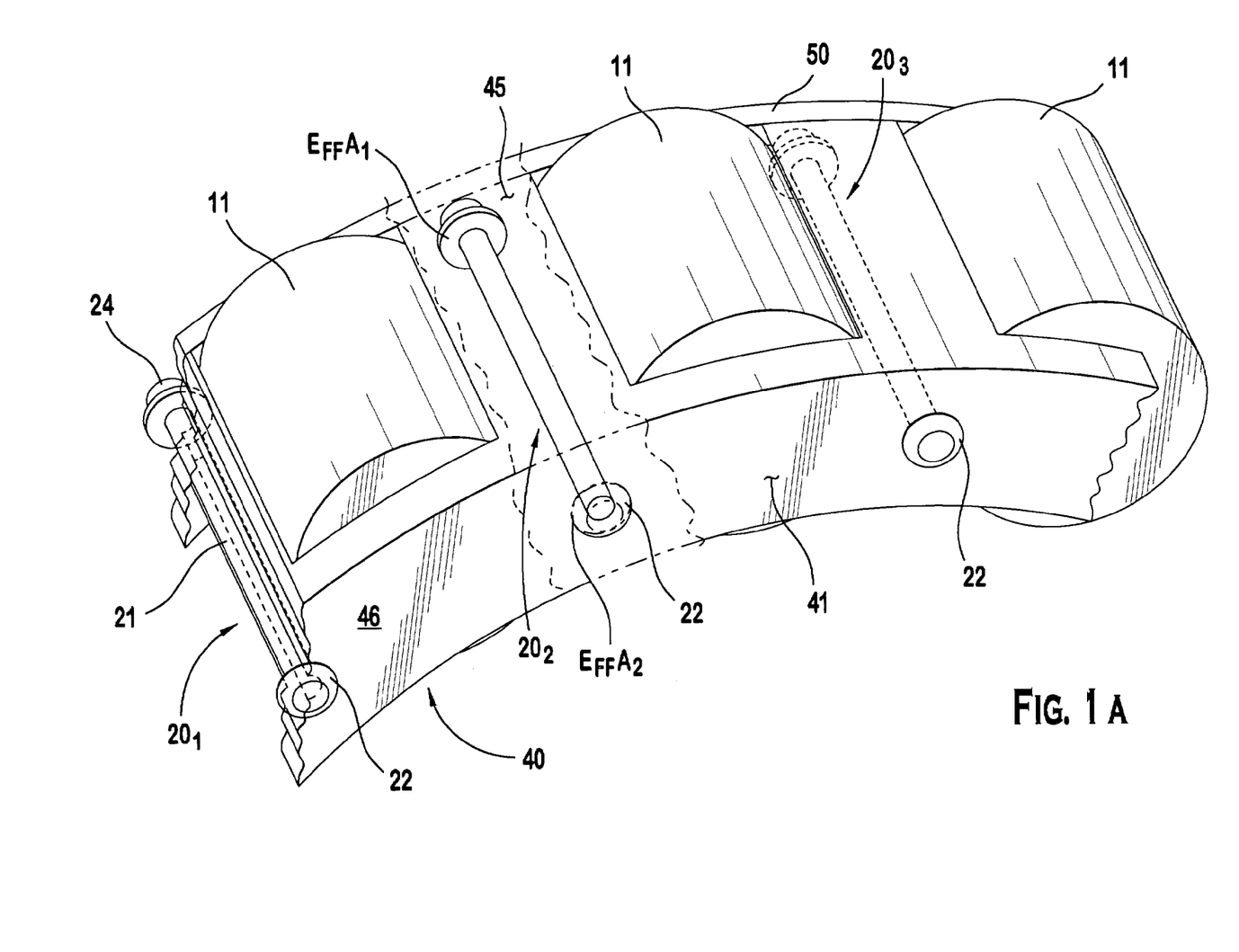
FIG. 1A illustrates a first preferred embodiment of a portion of a roller bearing in a sectioned perspective view showing a two-piece cage with rollers and a first embodiment of fasteners.
Figure 1B:
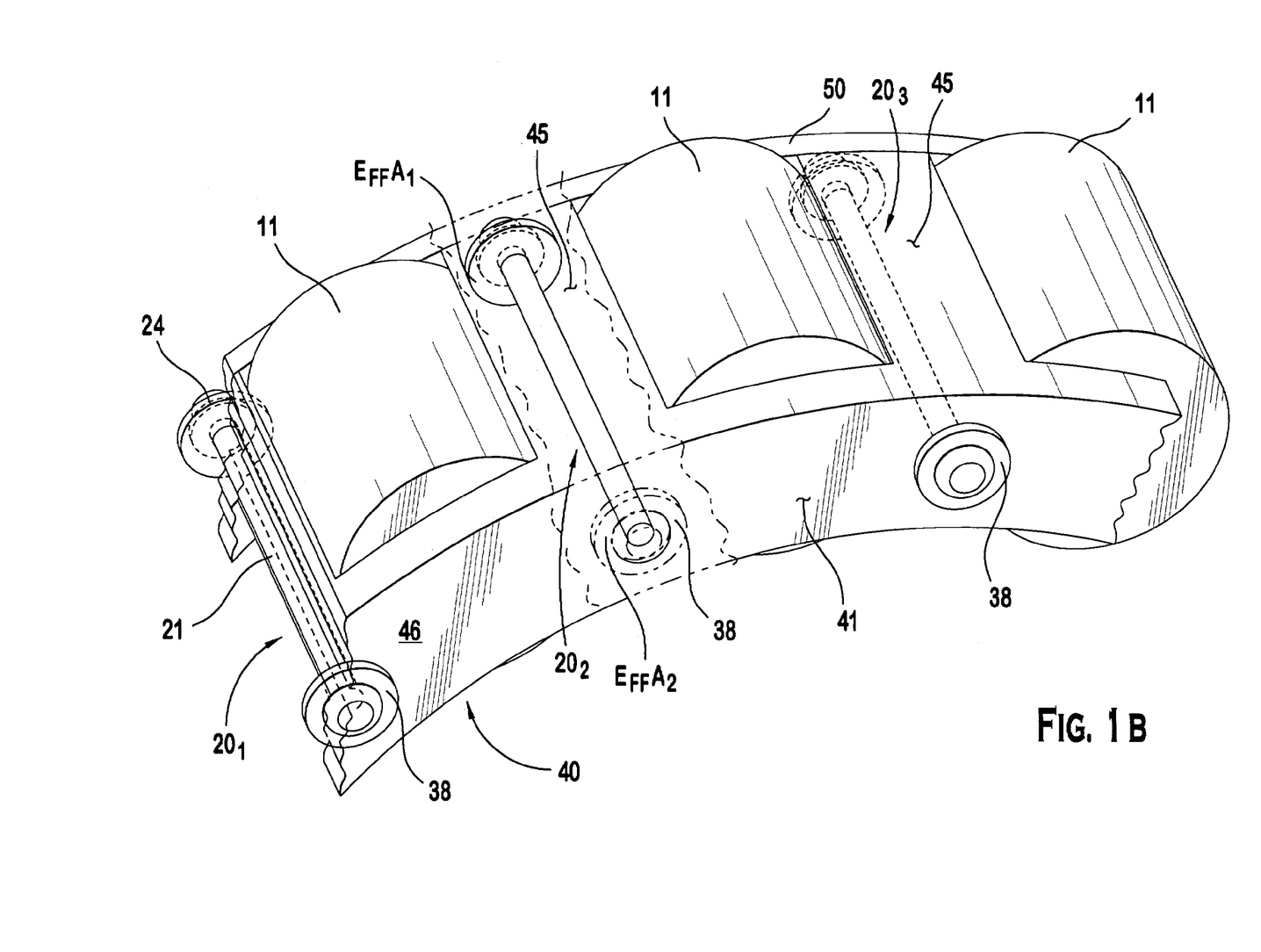
FIG. 1B illustrates a second preferred embodiment of a portion of a roller bearing in a sectioned perspective view showing a two-piece cage with rollers and a second embodiment of the fasteners.
Figure 1C:
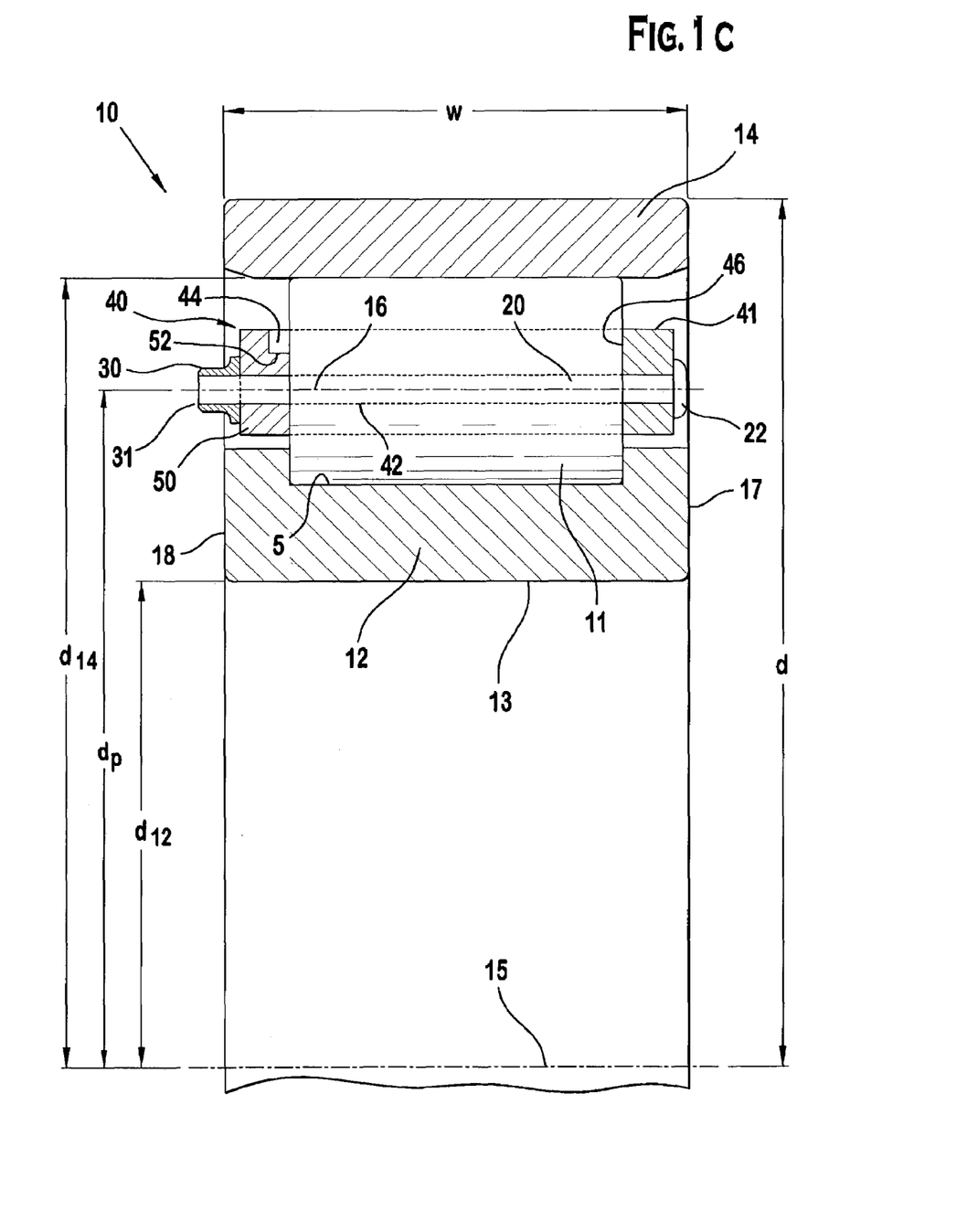
FIG. 1C illustrates a cross-sectional view of the roller bearing illustrated in FIG. 1A.
Figures 2, 3:
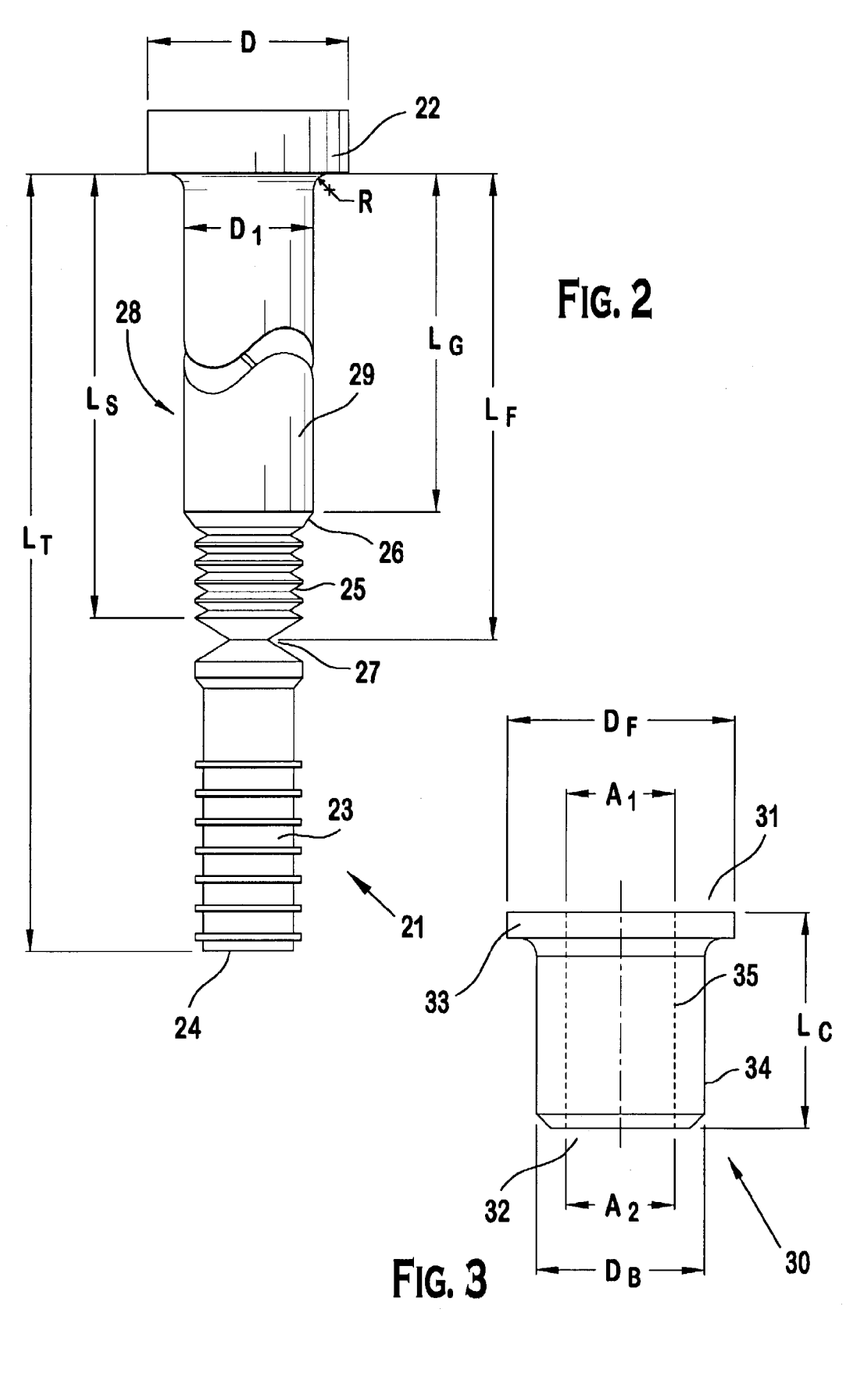
FIG. 2 illustrates a plan view of a first part of the first preferred embodiment of the fastener in FIGS. 1A and 1C.
FIG. 3 illustrates a plan view of a second part of the first preferred embodiment of the fastener in FIGS. 1A and 1C.

FIGS. 1–3 illustrate the preferred embodiments. In FIG. 1A, there is shown in a perspective view of a first preferred embodiment of cylindrical roller bearing 10 with varying degrees of sectioning. The bearing 10 has a cage 40, inner race 12, outer race 14, a plurality of fasteners $20_1$, $20_2$, $20_3$, ... $20_N$, each of the fasteners $20_1$, $20_2$, $20_3$, ... $20_N$ can include a bolt 21 with a collar 24, and a plurality of cylindrical rollers 11.

Cylindrical rollers 11 can be made of a suitable material such as, for example, low carbon, stainless steel or other alloys. Preferably, the rollers are formed from AISI 52100 steel for operation at approximately 200° C. (390° F.). The rollers 11 are preferably evenly distributed within bearing 10 about rotational axis 15. Each of the plurality of cylindrical rollers 111 preferably has an axis of rotation 16 that is parallel to rotational axis 15. Rollers 11 are free to spin about axis of rotation 16 while being constrained by inner race 12, outer race 14, and cage 40.

When fully assembled, bearing 10 has a toroidal shape with nominal width, w, defined between distal end 17 and proximal end 18. Referring to FIG. 1C, bearing 10 is disposed about rotational axis 15 and is radially defined by outer race 14 having an outer face a nominal distance d from axis 15, and by inner race 12 having inner ring 13 a distance $d_{12}$ from axis 15. Inner race 12 is radially disposed about rotational axis 15 and has a roller face 5, which radially constrains roller 11 from moving toward axis 15. Outer race 14 has an inner face a nominal distance $d_{14}$ from rotational axis 15 that constrains roller 11 from moving radially in a direction away from axis 15. The outer-most radial face of bearing 10 is the outer face of outer race 14. Inner race 12 and outer race 14 preferably have a longitudinal width, which also defines the nominal width, w, of bearing 10. And as used herein, the term "nominal" indicates a suitable dimensional tolerance for the indicated value sufficient for the components of the roller bearing to perform their intended functions.

In a preferred embodiment, cage 40 is radially disposed about rotational axis 15 and between outer race 14 and inner race 12. Cage 40 is preferably formed from brass and is a two-piece construction. More particularly, the preferred embodiment of cage 40 has an open-end cage 41 and a cage cover 50. When assembled, cage 40 contains rollers 11 between open-end cage 41 and cage cover 50. Preferably, rollers 11 are oriented in cage 40 such that axis of rotation 16 of each roller 11 is parallel with rotational axis 15 and rollers 11 are evenly radially distributed about rotational axis 15. To contain the rollers 11, open-end cage 41 preferably has a base 46 toroidally disposed about rotational axis 15 and a plurality of fingers 45 that longitudinally extend from base 46 forming roller pockets 43 therewith. Fingers 45 are preferably evenly distributed about axis 15. Rollers 11, when set between fingers 45 and base 46, are substantially free to spin about axis of rotation 16 while being angularly constrained between the races by fingers 45. When assembled cover 50 and base 46 constrain rollers 11 longitudinally with respect to axis 16.

In the preferred assembled cage 40, each finger 45 has an alignment tab 44 located on a circumferential perimeter of the finger that engages with alignment notch 52 of cover 50. As shown in FIG. 1C, each finger 45 preferably has fastener aperture 42, which is radially disposed at a nominal distance $d_p$ from the rotational axis 15. The radial distance $d_p$ is preferably substantially equal to the radial distance between rotational axis 15 and axis 16 (i.e., the roller pitch circle radius). As used herein, the lower case nomenclature "d" signifies a magnitude of a radius of a referenced component with respect to the rotational axis 15.

When cover 50 engages open end cage 41 such that alignment tab 44 is aligned with alignment notch 52, fastener aperture 42 of finger 45 is preferably in alignment with fastener aperture 42 of cover 50. A fastener (e.g., bolt 21 in combination with collar 30 or bolt 21 and collar 30 with at least one washer) is preferably used to secure cover 50 to open end cage 41 by, for example, inserting bolt 21 through fastener aperture 42 and securing it with flanged collar 30.

The cage fastener 20 preferably includes a bolt 21 (FIG. 2) having a head 22 of diameter D at its distal end, which is fastened to cage 40 with flanged collar 30. The bolt 21 extends along a longitudinal axis A—A, which is preferably parallel to the rotational axis 15. In the preferred embodiment, bolt 21 is installed such that head 22 engages the outer face of base 46 and flanged collar 30 engages the outer face of cover 50. More particularly, it is preferred that the pressure applied by flanged collar 30 to cover 50 is substantially equal to the pressure applied by head 22 to open end cage 41. In the preferred embodiment the parity in pressure is achieved by providing a collar 30 with an effective area $E_{FF}A_1$ that is substantially equal to the effective area $E_{FF}A_2$ of head 22. The effective area $E_{FF}A_2$ of head 22 may be defined as that portion of head 22 that engages base 46 (the difference between the area of head 22 and area of fastener aperture 42 as referenced orthogonally with respect to the longitudinal axis). Similarly, the effective area $E_{FF}A_1$ of collar 30 may be defined as the area of flange 33 (FIG. 3) minus the area of fastener aperture 42. The equality of pressure may also be achieved by providing a washer (FIG. 1B) between a collar 30 and cage 40 having an effective area substantially equal to the effective area of head 22. Alternatively, a washer 38 may be provided, between cage 40 and head 22, having a diameter substantially equal to the diameter of the washer between collar 30 and cage 40. The collar 30 may be provided with a constant exterior diameter, which is less than the diameter of the washer. One advantage to providing one or both of these washers is believed to be a propensity of the washers to remain flat against cage 40 even as head 22 or flange 33 is urged askew during tightening (e.g. swaging).

In another preferred embodiment, the parity in pressure is achieved by providing a collar 30 with a clamping area that is substantially equal to a clamping area of head 22. The clamping area of head 22 may be defined as that portion of head 22 that can be used to clamp against another surface (the difference between the area of head 22 and area of the shank 28 as referenced orthogonally with respect to the longitudinal axis). Similarly, the clamping area of collar 30 may be defined as the area of flange 33 (FIG. 3) minus the area of the bore 35. The equality of pressure may also be achieved by providing a washer (FIG. 1B) between a collar 30 and cage 40 having a clamping area substantially equal to the clamping area of head 22.

The preferred bolt 21 has a shank 28 that extends from head 22 a distance, $L_T$, and terminates at pintail 24 (the proximal end 31 of bolt 21). Shank 28 may be further defined as having a securement section of length $L_S$ extending from the head 22. The securement section of length $L_S$ may be more particularly characterized as having a grip 29, taper 26, and locking grooves 25. Even more particularly, at a distance $L_G$ from head 22, grip 29 may transition through taper 26 to locking grooves 25. Shank 28 has a diameter that varies in the preferred embodiment from the head 22 to the pintail 24. Grip 29 has a nominal diameter $D_1$ that is preferably larger than the outside diameter of locking grooves 25. The diameter of the portion of shank 28 that is furthest from head 22 is preferably marginally smaller than the outside diameter of locking grooves 25.

In the preferred embodiments, bolt 21 has a frangible portion 27 preferably located between locking grooves 25 and pintail 24. During the fastening of bolt 21 and collar 30 (in a process described below), shank 28 is severed in proximity to frangible portion 27. Upon securement of bolt 21 and collar 30, frangible portion 27 is substantially coincident with the proximal end 32 of installed collar 30. The final length, $L_F$, of bolt 21 may then be approximated as the distance between head 22 and proximal end 32 of collar 30.

FIG. 3 illustrates a preferred embodiment of flanged collar 30 having a distal end 31 and a proximal end 32. The flanged collar 30 is preferably made of unfinished (e.g. not plated) low carbon steel and has a length $L_C$. Collar 30 preferably has a barrel 34 at proximal end 32 with an outside diameter, $D_B$, and a flange 33 at distal end 31 with a diameter, $D_F$, which is preferably larger than barrel diameter $D_B$. Proximate the end 32 of collar 30 there is provided a chamfer. Flanged collar 30 has a fastener aperture 35 with a diameter, $A_1$, which is preferably equal to the diameter of fastener aperture 42 in cage 40. Fastener aperture 42 in collar 30 is preferably concentric with flange 33. Approximately at the distal end of chamfer, fastener aperture 42 transitions from diameter $A_1$ to smaller diameter $A_2$.

Installation of bolt 21 and flanged collar 30 can be as follows. Bolt 21 is inserted through fastener aperture 42. Flanged collar 30 is placed over pintail 24. A suitable installation tool is placed over pintail 24 to engage proximal end 32 of flanged collar 30. Another suitable tool can be used to grip pintail grooves 28. The installation tool can bring head 22 into engagement with open-end cage 41 and to bring flanged collar 30 into engagement with cover 50 thereby eliminating the gap between open-end cage 41 and cage cover 50. As the installation tool is operated, a swage die moves toward cage 40, swaging the flanged collar 50 into the locking grooves 25 of bolt 21, thus providing a permanent lock between bolt 21 and collar 30. After the swaging is completed, the bolt 21 can be separated from the pintail proximate the frangible portion 27 with a suitable tool.

There are a number of design parameters characterizing bearing 10 that were not believed to be important to the performance of the known bearings for adverse operating conditions prior to applicant's development of the preferred embodiments. In particular, the relationships between certain parameter values are believed to improve the performance of known bearings under conditions of unexpected vibration and shock, which are summarized in Tables 1 and 2. In the following description, any reference to the dimensions should be understood to be the dimensions of the preferred embodiments and variations due to acceptable tolerances of these dimensions sufficient for the components of the roller bearing to perform their intended function.

TABLE 1

Bolt

| Bolt | Dimension (inches) |
|---|---|
| D - head diameter | 0.445 |
| $D_1$ - grip dia. | 0.189 |
| $L_s$ - securement length | 3.5 |
| $L_f$ - final length | 3.6 |

TABLE 2

Collar

| Collar | Dimension (inches) |
|---|---|
| $D_f$ - flange diameter | 0.446 |
| $D_b$ - barrel diameter | 0.299 |
| $L_c$ - collar length | 0.290 |
| $A_1$ - collar opening diameter | 0.191 |

Preferred roller bearing 10 has sixteen (16) cylindrical rollers with a nominal diameter of 1.5 inches and a longitudinal length 2.441 inches. Outer race 14 has an outer face that is preferably a distance of d as measured from rotational axis 15. As used herein, the lower case nomenclature "d" signifies a magnitude of a radius of a referenced component with respect to the rotational axis 15. The outer face of the outer race 14 therefore has a diameter of two (2) times the distance d of the outer race for an outer face diameter of nominally 12.7 inches (320 millimeters). The outer race has an inner face located at a distance $d_{14}$ from the rotational axis 15. The inner face of the outer race 14 therefore has a diameter of two (2) times $d_{14}$ for an inner face diameter of nominally 11.5 inches. The inner ring 13 has a nominal diameter of two (2) times a distance $d_{12}$ for a diameter of nominally 7.1 inches (180 mm). Thus, the ratio of nominal inner ring diameter $(2*d_{12})$-approximately 7.1 inches—to nominal shank or grip diameter $(D_1)$-nominally 3/16 inches—is approximately 37.3, and the ratio of the nominal diameter at the outer face of outer race nominal diameter $(2*d)$—approximately 12.5 inches—to nominal shank or grip diameter $(D_1)$ is approximately 66.7. The inner and outer races have a nominal width, w, of approximately 3.4 inches, which is the longitudinal width of the outer race 14 and inner race 12. Cage 40 has a width of approximately 3.1 inches. Fastener apertures 42 are located a distance $d_p$ from axis 15. Similarly, open-end cage 41 (FIG. 1C) has a preferred nominal roller pitch circle diameter twice that of the distance $d_p$ $(2*d_p)$ for a nominal pitch diameter of approximately 10 inches.

There are preferably sixteen (16) bolts 21 (FIG. 2) inserted in fastener apertures 42 disposed generally equiangularly about rotational axis 15. Referring to FIG. 2, the preferred embodiment of bolt 21 has a nominal shank or grip $D_1$ diameter of 3/16 inches and a final length $L_F$ of approximately 3.5 inches. In a preferred embodiment, bolt 21 also has a head 22 diameter, D, of 0.445 inches, which is nearly 43% greater than the bolt head used in the known bearing cage. The transition between head 22 and grip diameter $D_1$ of the grip length 29 may have a suitable radius R. The grip diameter $D_1$ may be slightly larger for a suitable distance as measured from the tangency of the radius R. Additionally, the shank diameter immediately before the end of grip length 29 may be slightly smaller for a suitable distance.

One can calculate the effective area of head 22 to be the total area of head 22 minus the area of fastener aperture 42. One can further define the head aspect ratio of bolt 21 to be the ratio of final length, $D_F$ to head diameter, D. The preferred bolt will therefore have an aspect ratio of ten (10), and a total effective area of 0.127 in.$^2$ per bolt; reflecting an approximately 29% decrease to the aspect ratio over the bolts in the known bearing and increase in effective area of over 160%. Bolt 21 preferably has locking grooves 25 with an approximate outer diameter of between 0.185 and 0.177 inches. There may further be a taper 26 between grip 29 and locking grooves 25 and there may also be a taper substantially at the transition from the locking grooves 25 to taper 26. There may further be a radiused portion where taper 26 meets locking groove 25. At the end of securement length $L_S$ opposite head 22, there is a transition to break-off point 27. In the preferred embodiment head 22 has a diameter, D, that is nominally between 2.2 and 2.5 times the diameter of grip 29.

The preferred embodiment of flanged collar 30 has flange diameter, $D_F$ of 0.446 inches, and a barrel diameter, $D_B$, of 0.299 inches. The fastener aperture 42 in flanged collar 30 has a diameter, $A_1$, of 0.191 inches, which is less than 0.25 inches or nominally ¼ inches. The preferred effective area of flange 33 is therefore 0.128 in.$^2$ and is substantially equal to the effective area of head 22. This represents an increase of over 200% in comparison to the effective area of the known flange.

Both the bolt head and the collar flange are believed to minimize loading on the bolt, and it is therefore significant that the effective contact area per head/flange combination (the total contact area) is approximately 0.26 in.$^2$ in the preferred embodiment; representing an increase of greater than 180% over the known fasteners. For all sixteen bolts, there is preferably a total contact area of approximately four square inches (4 in.$^2$). Furthermore, as one can define the aspect ratio of bolt 21, so too can one define a head/collar aspect ratio as the sum of the diameters of head 22 and flange 33 (e.g., $D+D_F$=0.9 inches) divided by the final length of bolt 21 (e.g., $L_F$=3.5 inches) resulting in a preferable head/collar aspect ratio of approximately four (4) compared to a head/collar aspect ratio in fasteners of similarly sized known bearings of approximately 5.5. It is also relevant that final length $L_F$ of bolt 21 (in inches) is approximately 64% greater than the total effective contact area per bolt (i.e. the sum of the effective areas of the collar flange and the bolt head) in square inches.

There is also believed to be a significant relationship between the total effective contact area and the overall dimensions of the bearing. The nominal pitch diameter of bearing 10, measured about the rotational axis 15 to the center point of respective fastener apertures 42, is approximately ten inches (10 in.) and is approximately 2.5 times the total effective contact area (approximately 4 sq. in.) for all sixteen (16) bolts. With a preferred roller length of 2.441 inches and a preferred roller diameter of 1.496 inches, the aspect ratio of the preferred roller is about 1.632 (roller length/roller diameter). Having a preferred bolt head aspect ratio of ten (10), the preferred combination of bolt 21 and bearing 10 may be characterized by a bolt aspect ratio that is approximately six (6) times the roller aspect ratio. In comparison with known bearings, the known bearings have an nominal inner race diameter ($2*d_{12}$) to nominal grip diameter $D_1$ ratio of approximately 37.3, resulting in the ratio of the known head/collar aspect ratio over 55% greater than the pitch pocket diameter.

One may similarly compare the race diameter ratio (the ratio of the outer diameter of outer race 14 to the inner diameter of inner race 12) to the head/collar aspect ratio (the ratio of the sum of the diameters of head 22 and flange 33 to the final length of bolt 21). The preferred bearing has a head-collar aspect ratio of approximately 3.5 times the ratio of the outer race to the inner race diameters.

To evaluate whether the preferred fastener for a roller bearing according to the preferred embodiments would provide an adequate service life compared to the known roller bearings, testing was performed to provide a basis for comparing the known bearings to the preferred embodiments. Applicant believes that the ability to maintain a set preload at high temperature is indicative of the ability of the bearing to provide a suitable service life under adverse operating conditions. Hence, the known roller bearing and the roller bearing of the preferred embodiments were subjected to the simulated stress of varying magnitude of high temperatures in a series of test. In particular, to infer the increased loading capacity of the preferred embodiment, the average pre-load loss under thermal stresses for three (3) fastener configurations were determined; two (2) in accordance with the preferred embodiments, and one (1) in accordance with the known fastener configuration. In each configuration, the shank diameter of the bolt ranged from 0.1880 inches to 0.1895 inches, or nominally 3⁄16 inches, which is less than 0.25 inches or nominally ¼ inches. The tested known bolt (Pin #1) had a head diameter that ranged from 0.297 to 0.327 inches, with a grip length of between 3.147 to 3.157 inches. The bolt of the preferred embodiment (Pin #2) had a head diameter of between 0.430 and 0.460 inches with a grip length of between 3.210 and 3.220 inches. Thus, the average head diameter was approximately 43% greater in the preferred embodiment while the shank diameter and grip length ranges remained nominally equal.

Two collars were tested. The first (Collar #1), a known collar, had a flange diameter of between 0.297 inches to 0.327 inches with a total collar length of between 0.235, and 0.255 inches. The barrel diameter of the known collar was nominally equal to the flange length ranging from 0.297 to 0.302 inches. The second collar tested (Collar #2), that of the preferred embodiment, had a flange diameter of 0.440 to 0.450 inches, a barrel diameter of between 0.297 and 0.301 inches, and total length of 0.285 to 0.295 inches. In a third configuration, a washer having an outside diameter of 0.438 inches, an inside diameter of 0.188 inches, and a thickness of 0.063 inches was used.

Tests were performed on three (3) cage assemblies using the three (3) fastener configurations. The first assembly (cage 1) was configured with the three configurations throughout the sixteen (16) fastener apertures. The distribution of fastener configurations was as follows: 1) Configuration 2 in eight (8) of the sixteen (16) fastener apertures; 2) Configuration 3 in four (4) of the sixteen (16) fastener apertures; and 3) Configuration 1 in each of the remaining four (4) fastener apertures.

Configuration 2 was used exclusively in each of the fastener apertures of the second cage tested (Cage 2). The third cage tested (Cage 3) used only Configuration 3 fasteners in the assembly.

During testing, four (4) fasteners of each cage were preloaded at room temperature. The average preload is at least 1000 pound-force (lbf.) and preferably 2200 lbf. Thereafter, each cage was sectioned; one-half (½) of the remaining twelve (12) fastener assemblies in each cage being heated to 200° C., the other half being heated to 250° C. The residual pre-load torque in each of the remaining six (6) fasteners was measured by comparing fastener parameters before and after heating, as shown in Table 3 to determine the average preload loss. Table 3 indicates that at a high temperature, such as 250° C., the known bearing lost a proportionally greater amount of preload than the preferred embodiments, as shown by configurations 2 and 3 in Table 3 below.

TABLE 3

Comparison of Preload Loss under Thermal Stress.

| Roller Bearing | Average Preload Loss @ 150° C. | Average Preload Loss @ 200° C. | Average Preload Loss @ 250° C. |
|---|---|---|---|
| Known Bolt and Collar (Config. 1) | | 141 lbf. | 1208 lbf. |
| New Bolt and New Collar (Config. 2) | N/A | 91 lbf. | 512 lbf. |
| New Bolt with Known Collar and Washer (Config. 3) | N/A | 161 lbf. | 694 lbf. |

In particular, at a temperature of 200° C., there was found an average pre-load loss in fastener configuration #2 of 91 lbf, and an average pre-load loss in fastener configuration #3 of 161 lbf. At 250° C., the average pre-load loss for the known fastener (Configuration #1) was 1208 lbf for average preload loss of over 50% from the original preload. At 250° C., the average preload loss for a preferred embodiment of the fastener (Configuration #2) was 512 lbf for an average preload loss of about 23%, whereas the average pre-load loss for another preferred embodiment (Configuration #3) was 694 lbf for an average preload loss of about 31% from the original preload. Based on Table 3, it is believed that the preferred embodiments (Configurations 2 and 3) would be able to provide for a suitable service under adverse operating conditions. Applicant has determined that a preload loss of less than 50%—and preferably 35% or less—under the conditions specified herein is acceptable to demonstrate a suitable service life under adverse operating conditions.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A roller bearing comprising:
an inner race disposed about a rotational axis, the inner race having a peripheral surface facing the rotational axis with an inner nominal diameter of seven (7) inches about the rotational axis;
an outer race having a circumferential surface surrounding the inner race and having an outer nominal diameter of twelve (12) inches about the rotational axis;
a plurality of rollers disposed between the inner and outer races;
a roller cage disposed between the inner race and the outer race to support the plurality of rollers, the roller cage having a first piece and a second piece connected together by at least one cage fastener, the at least one cage fastener including:
a first surface having a first effective area in contiguous engagement with the first piece of the roller cage; and
a second surface having a second effective area in contiguous engagement with the second piece of the roller cage, the first and second areas being generally equal to each other.

2. The roller bearing of claim 1, wherein each of the first and second effective surface areas is greater than 0.048 square inches.

3. The roller bearing of claim 2, wherein the first surface includes a bolt head and the second surface includes a collar, the collar including a flanged portion, the flanged portion having an exterior diameter of about 0.45 inches.

4. The roller bearing of claim 2, wherein the first and second surface include at least one of a washer.

5. The roller bearing of claim 2, wherein the at least one cage fastener has a fastener length and the first surface has first diameter such that a ratio of the fastener length to the first diameter is at least approximately 10.

6. The roller bearing of claim 2, wherein the at least one cage fastener comprises a plurality of cage fasteners distributed equiangularly about the rotational axis, each of the fasteners having a nominal roller pitch diameter of approximately 10 inches, the plurality of cage fasteners having a sum of the respective first area of about four inch squared, each of the cage fasteners having a total length greater than 3.4 inches.

7. The roller bearing of claim 6, wherein the at least one cage fasteners extends through respective fastener opening in the first piece and the second piece along the rotational axis, the respective fastener opening having a diameter of less than ¼ inches.

8. The roller bearing of claim 6, wherein the plurality of rollers comprises rollers distributed equiangularly about the rotational axis, each of the rollers having a roller aspect ratio of about 1.6.

9. The roller bearing of claim 6, wherein the first piece of the roller cage comprises an annular cover having a first cage cover surface and a second cage cover surface spaced therefrom along the rotational axis, the first cage cover surface in contiguous engagement with the first surface of the fastener, the second cage cover surface having a plurality of alignment notches located equiangularly about the rotational axis proximate the outer perimeter of the annular cover, a plurality of first apertures equiangularly disposed about the rotational axis and extending through the first and second cage cover surfaces.

10. The roller bearing of claim 9, wherein the second piece of the roller cage comprises an annular base having a plurality of projecting fingers extending along the rotational axis, the projecting fingers being disposed generally equiangularly about the rotational axis, each of the projecting fingers having an alignment tab proximate an outer perimeter of the projecting finger to mate with the alignment notch, the plurality of projecting fingers having a respective plurality of second apertures extending through the fingers and the base so that the at least one fastener extends through the first aperture to the second aperture to retain the first and second pieces of the roller cage.

11. A roller bearing comprising:
an inner race disposed about a rotational axis, the inner race having a peripheral surface facing the rotational axis with an inner nominal diameter of seven (7) inches about the rotational axis;

an outer race having a circumferential surface surrounding the inner race and having an outer nominal diameter of twelve (12) inches about the rotational axis;

a plurality of rollers disposed between the inner and outer races;

a roller cage disposed between the inner race and the outer race to support the plurality of rollers, the roller cage having a first piece and a second piece connected together by at least one cage fastener, the at least one cage fastener including:

a first surface having a first effective area in contiguous engagement with the first piece of the roller cage;

a second surface having a second effective area in contiguous engagement with the second piece of the roller cage, at least one of the first and second surface having a diameter about the longitudinal axis greater than 0.375 inches;

a shank connecting the first and second surfaces, the shank having a nominal diameter less than $\frac{1}{4}$ inches and a length greater than 3.4 inches along the longitudinal axis.

12. The roller bearing of claim 11, wherein each of the first and second effective surface area is greater than 0.048 square inches.

13. The roller bearing of claim 12, wherein the at least one cage fastener comprises a bolt head, the bolt head having a head surface facing one of the first and second pieces of the roller cage, the head surface providing the first surface, and wherein the at least one fastener further comprises a collar, the collar including a generally cylindrical portion and a flanged portion.

14. The roller bearing of claim 12, wherein at least one of the first and second surfaces includes a washer.

15. The roller bearing of claim 12, wherein the at least one cage fastener comprises a member with a shaft having a fastener length between a first end and a second end extending along a longitudinal axis, the first end being supporting a shoulder of the first surface, the shoulder extending generally orthogonal to the longitudinal axis to define a first diameter such that a ratio of the fastener length to the first diameter is at least approximately 10.

16. The roller bearing of claim 12, wherein the at least one cage fastener comprises a plurality of cage fasteners distributed equiangularly about the rotational axis, the plurality of cage fasteners having a sum of the respective first areas of about four inch squared.

17. The roller bearing of claim 16, wherein the at least one cage fasteners extends through respective fastener opening in the first piece and the second piece along the rotational axis, the respective fastener opening having a diameter of less than $\frac{1}{4}$ inches.

18. The roller bearing of claim 16, wherein the plurality of rollers comprises rollers distributed equiangularly about the rotational axis, each of the rollers having a nominal roller pitch diameter of approximately 10 inches and an aspect ratio of about 1.6.

19. The roller bearing of claim 16, wherein the first piece of the roller cage comprises an annular cover having a first cage cover surface and a second cage cover surface spaced therefrom along the rotational axis, the first cage cover surface in contiguous engagement with the first surface of the fastener, the second cage cover surface having a plurality of alignment notches located equiangularly about the rotational axis proximate the outer perimeter of the annular cover, a plurality of first apertures equiangularly disposed about the rotational axis and extending through the first and second cage cover surfaces.

20. The roller bearing of claim 19, wherein the second piece of the roller cage comprises an annular base having a plurality of projecting fingers extending along the rotational axis, the projecting fingers being disposed generally equiangularly about the rotational axis, each of the projecting fingers having an alignment tab proximate an outer perimeter of the projecting finger to mate with the alignment notch, the plurality of projecting fingers having a respective plurality of second apertures extending through the fingers and the base so that the at least one fastener extends through the first aperture to the second aperture to retain the first and second pieces of the roller cage.

21. A roller bearing including a fastener, the fastener securing at least two members of the roller bearing together, the at least two members extending along a longitudinal axis over a length of at least 3 inches, the fastener comprising:

a shank having a first end and a second end disposed along a longitudinal axis, the shank having a diameter less than $\frac{1}{4}$ inches to define a shank surface area generally orthogonal to the longitudinal axis, a shoulder proximate the first end, the shoulder having a first clamping area generally orthogonal to the longitudinal axis, the first clamping area being the difference between a surface area of the shoulder orthogonal to and about the longitudinal axis and the shank surface area;

a collar being disposed on the shank so that the second end is proximate a frangible portion of the shank, the collar having a bore extending along the longitudinal axis between a first collar end and a second collar end, the bore having an internal diameter of less than $\frac{1}{4}$ inches to receive the shank, one of the first and second collar ends having a second clamping area, the second clamping area being the difference between a surface area of the first end orthogonal to and about the longitudinal axis and the surface area of the bore orthogonal to and about the longitudinal axis, the second clamping area being generally equal to the first clamping area.

22. The roller bearing of claim 21, wherein the shank comprises a length between the shoulder and the frangible portion being greater than 3.4 inches.

23. The roller bearing of claim 22, wherein the first clamping area comprises a first diameter of at least 0.445 inches such that an aspect ratio of the first diameter to the length is approximately 10.

24. The roller bearing of claim 23, wherein each of the first and second clamping areas comprises a washer.

25. The roller bearing of claim 23, wherein the first clamping area comprises a bolt head.

\* \* \* \* \*